June 11, 1957
C. R. CRANDALL
2,795,345
ATTACHMENT FOR BOAT TRAILERS
Filed March 4, 1955
2 Sheets-Sheet 1
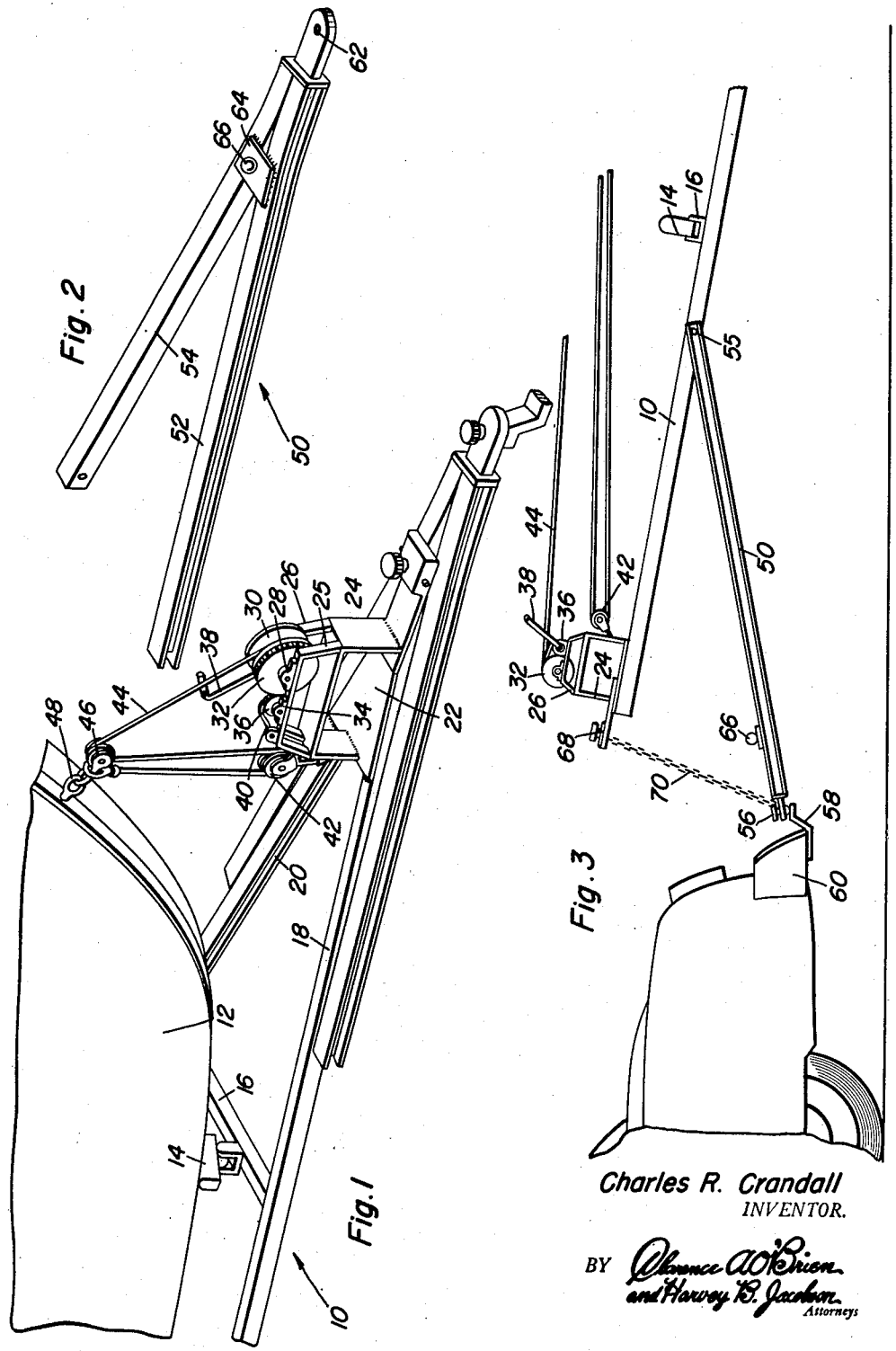
Charles R. Crandall
INVENTOR.
BY *Clarence A. O'Brien*
*and Harvey B. Jackson*
Attorneys

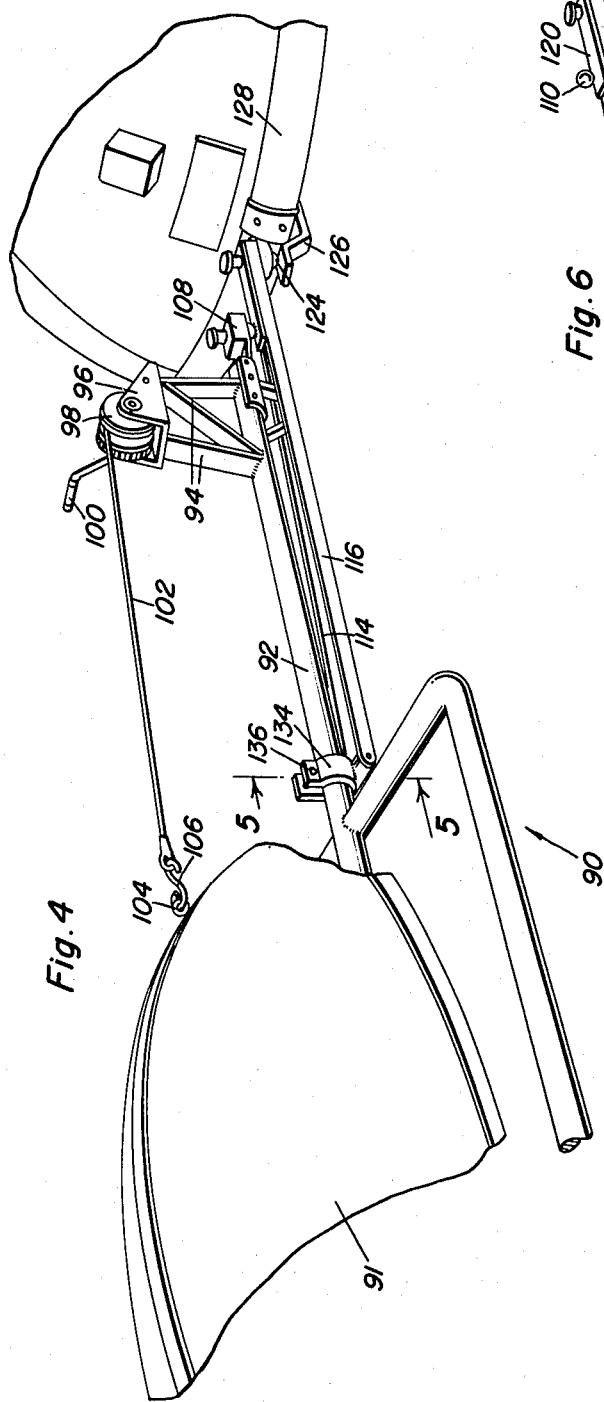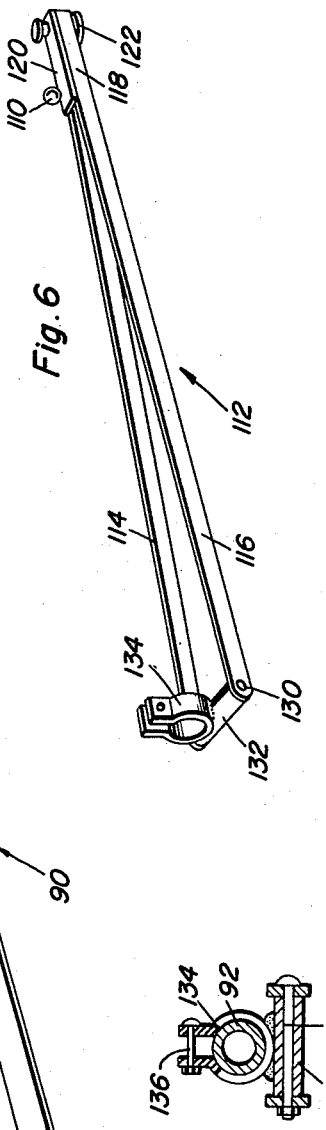
Charles R. Crandall
INVENTOR.

United States Patent Office 2,795,345
Patented June 11, 1957

2,795,345

ATTACHMENT FOR BOAT TRAILERS

Charles R. Crandall, West Palm Beach, Fla.

Application March 4, 1955, Serial No. 492,270

1 Claim. (Cl. 214—506)

This invention relates to an attachment for trailers especially adapted for use on boat trailers or the like whose primary object resides in the provision of means for permitting the trailer tongue to be elevated without detaching the trailer from the towing vehicle for the purpose of changing the angle of the bed of the trailer so that the contents would slide more easily off the rear or may be easily positioned thereon.

A further object of the invention resides in the provision of a device as applied to boat trailers or the like so as to permit the raising of the tongue thereof so that the rear of the trailer can be lowered to permit the sliding of a boat on and off the trailer into a body of water without having to submerge the bed of the trailer.

The construction of this invention features the use of an auxiliary drawbar which is pivotally attached to the trailer tongue adjacent the end of the tongue which is secured to the trailer, the auxiliary drawbar being attached to the towing vehicle in any convenient and conventional manner.

Still further objects and features of this invention reside in the provision of a trailer attachment which is simple in construction, highly efficient in use, strong, durable, and relatively inexpensive to manufacture thereby permitting wide use and distribution.

These, together with the various ancillary objects and features of the invention which will become apparent as the following description proceeds, are attained by this trailer attachment, preferred embodiments of which have been illustrated in the accompanying drawings, by way of example only, wherein:

Figure 1 is a perspective view of one form of the trailer attachment comprising the present invention, being shown also is winch means for drawing a boat onto the trailer;

Figure 2 is a perspective view of the auxiliary drawbar comprising one of the important features of the invention;

Figure 3 is a side elevational view of the invention shown with the tongue in an elevated position for raising or lowering a boat or the like onto the trailer;

Figure 4 is a perspective view of a modified form of the invention;

Figure 5 is an enlarged sectional detail view as taken along the plane of line 5—5 in Figure 4 and illustrating in particular the combined clamp means and pivotal connection between the auxiliary drawbar and the tongue; and Figure 6 is a perspective view of the auxiliary drawbar shown pivotally attached to the combined clamp means and pivotal connection.

With continuing reference to the accompanying drawings wherein like reference numerals designate similar parts throughout the various views, and with initial attention directed to Figures 1 through 3, reference numeral 10 generally designates a boat trailer which may be of conventional construction and which is adapted to support a boat 12 thereon. Suitable guides or roller mechanisms 14 may be supported on braces 16 of the boat trailer 10.

In this form of the invention, the boat trailer may include converging side frame members 18 and 20 of any suitable construction and which may be formed of channel members as may be desired. Mounting plates 22 may be welded or otherwise secured to the frame members 18 and 20 for carrying a mounting structure 24 of generally inverted U-shape which is welded to the plates 22 and which carry mounting brackets 25 and 26 carrying the journal blocks as at 28 for a winch 30 having a gear 32 coaxial therewith and forming one of the sides of the winch 30, as well as other bearing blocks, as at 34, which provide the mounting for a drive gear 36 driven by means of a crank 38. The gear 36 engages the gear 32 to rotate the drum as may be desired. A latching pawl 40 may be suitably mounted on the supporting brackets 25 and 26 for engagement with the gear 36 to prevent rotation thereof, when such is desired. Mounted on the support 24 may be a suitable pulley 42 and a cable 44 may be wound about the drum 30 and entrained about a pulley 46 and the pulley 42 and thence connected to an eye 48 on the boat 12, thus serving to provide the desired mechanical advantage to draw the boat 12 onto the trailer 10 and hold it in place by means of the locking action of the pawl 40.

One of the most important aspects of the invention lies in the provision of the auxiliary drawbar 50 which may be formed from a pair of channel-shaped legs 52 and 54 which are pivoted to the tongue of the trailer 10, by means of suitable bolts or other fasteners 55 which extend through the rear ends of the auxiliary drawbar 50 and through the tongue adjacent the main body of the trailer 10. This can be seen best in Figure 3. The auxiliary drawbar 50 may be provided with a conventional fastening mechanism 56 for engagement with the towing bracket 58 affixed to the towing vehicle 60. The fastener 56 may be carried by the end 62 of the drawbar 50. Also mounted on the drawbar 50 is a mounting plate 64 for a conventional ball 66 of a ball and socket connector, the socket being carried, as at 68, by the free end of the tongue of the trailer 10.

The operation of this trailer attachment is quite simple. When the boat has been taken to a position where it is ready to be launched, it is merely necessary to back off on the winch 30 and to disengage the ball and socket connector 66 and 68, thereby allowing the two-wheel trailer to tilt backward and the boat to slide off. When it is desired to retrieve the boat, the cable 44 may be attached to the prow of the boat, and with the trailer 10 in a tilted position, the winch 30 can be actuated, thereby pulling the boat onto the trailer until it is so balanced that the tongue 10 may be easily pushed into a position where the ball and socket connection 66 and 68 becomes engaged. A chain 70 may be terminally connected to the free end of the tongue of the trailer 10 and to the end of the drawbar 50 affixed to the vehicle 60, the chain 70 serving to limit the pivotal movement of the tongue 10.

Referring now to the embodiment of the invention as is shown in Figures 4 through 6, reference numeral 90 is used to generally designate the boat trailer employing the present invention. The boat trailer 90 may be of any desired construction and is adapted to support a boat thereon. The boat trailer 90 includes a tongue 92 which may be of tubular construction, if desired. Mounted on the free end of the tongue 92 are suitable supports 94 carrying a mounting structure 96 for a winch 98 which may be operated by crank 100 in any desired manner. Entrained about the winch 98 is a cable 102 which may be connected to a suitable eye 104 attached to the boat by any suitable connecting elements 106.

Attached to the free end 90 of the tongue 92 is a conventional socket 108 of a ball and socket trailer hitch connector, the ball being carried, as at 110, on the axiliary drawbar generally designated at 112.

The auxiliary drawbar 112 may include a pair of legs 114 and 116 which are joined together at the ends 118 thereof to which the plate 120 carrying the ball connector 110 is attached. Another conventional socket connector, as at 122, is provided on the end of the drawbar 112 for engagement with a spherical or ball connector 124 carried by the mounting bracket 126 attached to the towing vehicle, as at 128.

The legs 114 and 116 are pivotally attached by means of a shaft or pin 130 to a pivotal mounting member 132 carrying a clamp 134 adapted to slidably embrace the tongue 92 and to be slidable relative thereto and to be lockingly held in an adjusted position by means of a bolt 136.

In use, the shaft or bolt 130 provides a pivotal connection for the auxiliary drawbar 112 with respect to the tongue 92, and when the ball and socket connections 118 and 110 are disengaged, the tongue 92 is free to be elevated so as to lower the end of the trailer adjacent the water whereby the boat 91 may be easily lowered into the water. Further, the clamping pivotal connection formed by the clamp 134 and the shaft 130 permit longitudinal adjustment of the drawbar 112 and the tongue 92 when it is desired to extend the trailer 90 further into the water without moving the towing vehicle 128 closer to the bank of the body of water.

The foregoing is considered as illustrative only of the principles of the invention. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A trailer attachment for use in combination with a trailer having a tongue for permitting said tongue to be elevated without detaching the trailer from a towing vehicle comprising an auxiliary drawbar adapted to be attached to a towing vehicle, said drawbar including a pair of divergent legs, clamping means pivotally attached to said divergent legs at the divergent ends thereof, said clamping means longitudinally adjustably clampingly engaging said tongue longitudinally adjusting said drawbar with respect to said tongue, a winch carried by said tongue, and a ball and socket connection between the free end of said tongue and said drawbar.

References Cited in the file of this patent

UNITED STATES PATENTS

| | | |
|---|---|---|
| 2,327,308 | Johnston | Aug. 17, 1943 |
| 2,485,793 | Vassar | Oct. 25, 1949 |
| 2,523,211 | Hedgpeth | Sept. 19, 1950 |
| 2,538,704 | Pole | Jan. 16, 1951 |